United States Patent [19]

DiFoggio et al.

[11] Patent Number: 4,746,210
[45] Date of Patent: May 24, 1988

[54] CENTRIFUGE STROBE METHOD AND CIRCUIT

[75] Inventors: Rocco DiFoggio, Houston; Gordon L. King, Bellaire, both of Tex.

[73] Assignee: Shell Oil Company, Houston, Tex.

[21] Appl. No.: 16,515

[22] Filed: Feb. 17, 1987

Related U.S. Application Data

[63] Continuation of Ser. No. 812,605, Dec. 23, 1985, abandoned.

[51] Int. Cl.⁴ .................................................. G01P 3/40
[52] U.S. Cl. ....................................... 356/23; 356/427; 494/10
[58] Field of Search .............. 73/1 DL, 5; 494/10, 494/85; 356/426, 427, 428, 23; 324/75, 391, 392

[56] References Cited

U.S. PATENT DOCUMENTS

| | | | |
|---|---|---|---|
| 3,286,165 | 11/1966 | Small | 324/391 |
| 3,599,002 | 8/1971 | Beutelspacher | 356/23 |
| 3,727,124 | 4/1973 | Kahen | 324/392 |
| 4,454,475 | 6/1984 | Tsuchiya | 324/392 |
| 4,567,373 | 1/1986 | O'Meara, Jr. et al. | 356/427 |
| 4,572,663 | 2/1986 | Greene et al. | 356/23 |

FOREIGN PATENT DOCUMENTS 0138383  4/1985  European Pat. Off. .............. 494/10

*Primary Examiner*—Stewart J. Levy
*Assistant Examiner*—Robert R. Raevis

[57] ABSTRACT

A new method and electronic circuit are provided to prevent image creep in automated centrifuges. The method and circuitry automatically substract a fixed time delay, which is associated with the strobe detection and firing circuitry, from a longer variable time period, which is inversely proportional to the rotational speed of the centrifuge, to thereby delay the flash of the strobe by a time inversely proportional to centrifuge rotation speed.

8 Claims, 3 Drawing Sheets

CENTRIFUGE STROBE METHOD AND CIRCUIT

This is a continuation of application Ser. No. 812,605, filed Dec. 23, 1985, now abandoned.

BACKGROUND OF THE INVENTION

This invention relates to centrifuges, and more particularly, relates to centrifuges and circuitry therein.

Automated centrifuges, such as taught in U.S. Pat. No. 4,567,373, filed Oct. 20, 1982, automatically monitor a sample during centrifuging and provide data points indicative of a desired characteristic of the sample that is being tested during the centrifuging. More particularly, these automated centrifuges may image the position of fluids or fluid interfaces in a sample holder as it rotates. Such automated systems minimize manpower needs and provide a plurality of data points at predetermined intervals throughout the centrifuge run.

Further, a computer may be employed to analyze the data in real time to provide an output indicative of the amount of fluid or fluids produced by the sample during centrifuging. Such centrifuges typically employ a strobe that provides light, or other types of radiation, which impinges on the sample holders or collection tubes. The light impinging on the collection tube may then be collected by suitable detector array. However, it must be possible to identify and align the respective sample holders with index marks as is known in the art, to appropriately allow for imaging the proper holder in the proper time sequence.

Conventional centrifuge strobe firing circuits usually fire only when the holder of interest is detected as overhead or below the strobe. However, due to the intrinsic delay in the detecting and firing circuit, this leads to a "forward creep" of the tube image with increasing centrifuge speed. The magnitude of this forward creep increases with increasing speed until the tube image may completely move out of view of the appropriate detectors. Previous attempts to solve this problem have consisted chiefly of requiring the operator of the centrifuge to visually review the flash position of the strobe relative to the holder and via appropriate mechanical manipulation of the strobe, reposition the strobe to continue flashing on the desired holder. The term "flash" is used herein to means the time at which a stobe reaches its maximum brightness. However, such adjustment by the operator may be required for several different speed ranges as the speed of the centrifuge is gradually increased. These continuing attentions of the operator to the flashing of the strobe and operation of the centrifuge defeats an important objective of the automated centrifuge, i.e. relieving the operator of the tedium of attending to the operation of the centrifuge.

These and other limitations and disadvantages of the prior art are overcome by the present invention, however, and improved methods and circuitry are provided for automatically preventing image creep in a centrifuge as its speed is increased from low speed to maximum speed.

SUMMARY OF THE INVENTION

In a preferred embodiment of the present invention, a method and electronic circuitry for firing the strobe of a centrifuge are provided that eliminates creep of an image during changing centrifuge speeds. The preferred method and circuitry of the present invention compensate for the delay of the detection and strobe firing circuitry. The preferred method and circuitry include a means for measuring a time inversely proportional to the rotational speed of a centrifuge. The measured intrinisic delay time of the strobe firing circuitry is subtracted from this time that is inversely proportional to the rotational speed of the centrifuge. The method and circuitry then wait for a time corresponding to the rotational speed minus the intrinsic delay to signal the strobe to fire. A short time later (the intrinsic delay time), the strobe flashes.

In a presently preferred embodiment of the present invention circuitry is provided for the firing of a strobe delayed by a time inversely proportional to the instantaneous rotor speed minus the intrinsic circuitry delay of the strobe detecting and firing circuit, to eliminate image creep. The detector of the appropriate sample holder and/or sample holder speed is required to be initially adjusted to compensate for the added delay imposed by the circuitry of the present invention.

It is an object of the present invention to provide methods and circuitry to prevent image creep in automated centrifuges.

These and other features, objects and advantages of the present invention will become apparent from the following detailed description, wherein reference is made to the figures in the accompanying drawings.

IN THE DRAWINGS

DETAILED DESCRIPTION OF THE PREFERRED EMBODIMENTS

Figure 1:
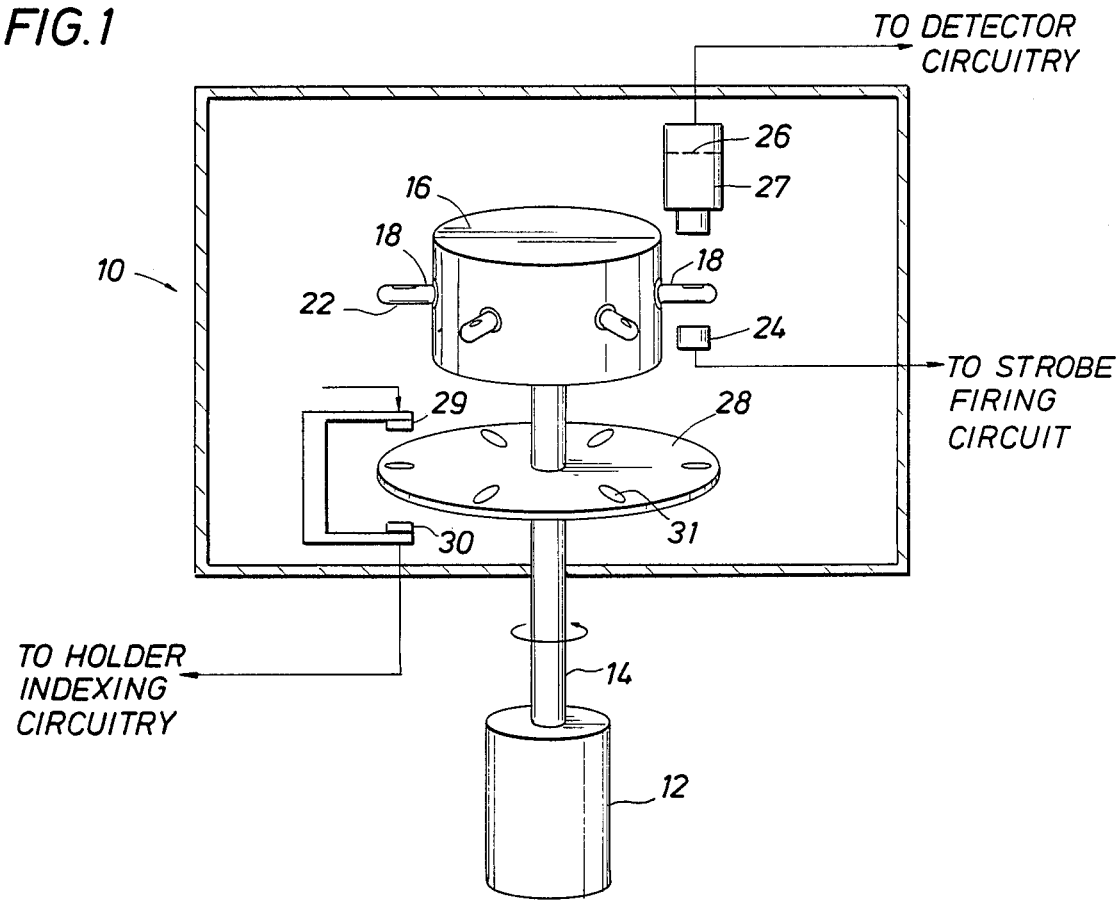
FIG. 1 is a partially diagrammatic side view of a centrifuge.

Referring now to FIG. 1, there may be seen a simplified representation of an automated centrifuge 10. More particularly, centrifuge 10 consist of a motor 12 which drives the shaft 14; shaft 14 is connected to a rotor 16 which holds sample holders 18 by any convenient means. Sample holders 18 may have a transparent collection tube 22 for collecting fluids displaced from the samples during centrifuging. A strobe 24 is positioned so that the light emitted therefrom impinges on one of the collection tubes 22. A detector array 26 is positioned on the opposite side of collection tube 22 so that at least a portion of the light rays from strobe 24 may pass through the collection tube 22 and impinge on the detector array 26. Typically, detector array 26 is mounted in a camera 27 and the only light that enters camera 27 is the light provided by strobe 24. Detector array 26 and strobe 24 may be in reversed positions, or on the same side of holder 18.

Also depicted in FIG. 1 is reference disc 28 and photo detector pair 29 and 30. Reference disc 28 has slits 31 therein which are aligned roughly under the corresponding sample holder 18. In this manner a visible light, infated, or other radiation emitting diode 29 will continuously emit radiation which may be sensed by detector 30. However, detector 30 will only sense radiation from diode 29 when a slit 31 in reference disc 28 passes therebetween. In this manner the output of detector 30 corresponds to a sharp rise in intensity which comes from the leading edge of the slit and then has a sharp decreasing edge corresponding to the trailing edge of the slit and the loss of illumination. Other means for sensing the position and/or rotational speed of the holders may be employed with the concepts of the present invention. Such other means may be, for example, but not limited to a permanent magnet on the rotor passing a stationary detection coil (or Hall probe), or reflecting stripes on the rotor reflecting light from a stationary light source to a stationary detector.

Figure 2:
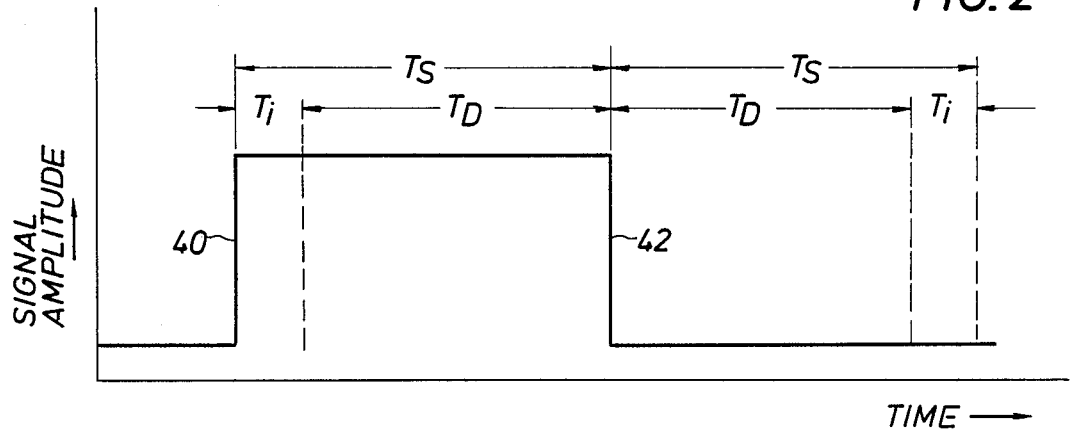
FIG. 2 illustrates certain timing intervals that are illustrative of certain features of the method and circuitry of the present invention.

Referring now to FIG. 2 there may be seen a representation of the signal from detector 30 as a slit 31 in reference disc 28 passes between the diode 29 and detector 30. More particularly, there may be seen to be a leading edge 40 of the signal which corresponds to the passage of the leading edge of a slit 31 in the reference disc 28 passing between the detector 30 and diode 29. The signal from the detector 30 then remains at some constant magnitude during the transit of the opening of the slit 31 between the pair. The amplitude then quickly decreases, which corresponds to the trailing edge of the slit 31 in the reference disc 28 passing between the pair. The total width of the detector signal from the leading edge 40 to the trailing edge 42 is functionally related to the rotational speed of the rotor, i.e. is inversely proportional to the rotational speed. This time $T_s$ is the time that it takes for the slit 31 to cross between the pair. Also depicted in FIG. 2 is time $T_i$ which is the intrinsic delay of the strobe sensing and firing circuitry.

Figure 3B:
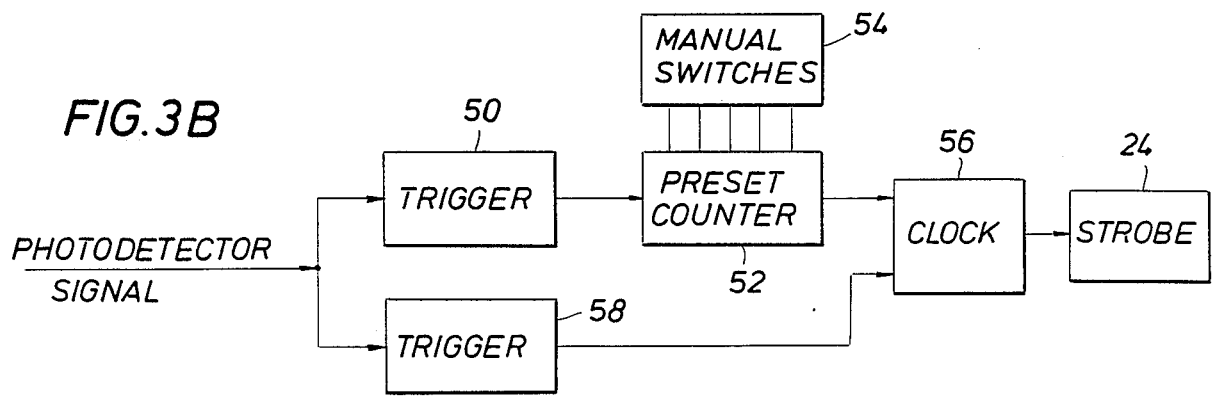
FIG. 3B is an illustrative block diagram of the circuitry of the present invention.
Figure 3A:
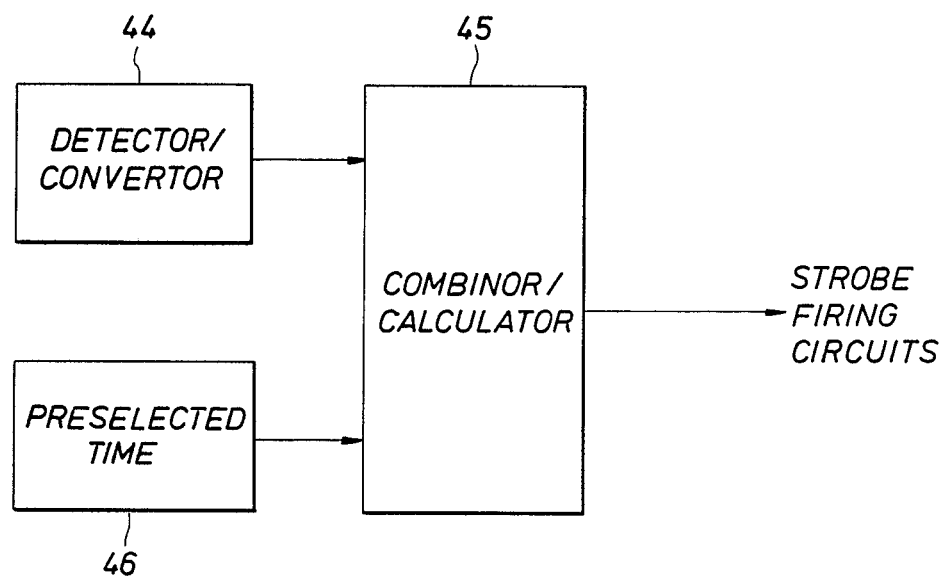
FIG. 3A is a functional block diagram of the method of the present invention.

Referring now to FIG. 3A, there may be seen a functional block diagram of the method of the present invention. More specifically, there may be seen block 44 for detecting the rotational speed of the centrifuge and for converting the rotational speed into a variable time interval that is functionally related to the rotational speed; preferably, this variable time interval is inversely proportional to the rotational speed. The block for detecting and converting 44 provides a signal representative of this variable time interval to a block 45 for activating the strobe. Block 45 also receives a signal representative of the strobe detection and firing circuitry intrinsic time delay from a block 46 that may be suitably adjustable to a preselected fixed time. Block 45 combines the signals from block 44 and block 46 to calculate a new strobe firing time based upon the signals from block 44 and block 46, and used this new firing time to send a signal to the strobe causing the strobe to fire based upon the detection of the passage of a holder past the detector for detecting holder identity and/or speed. Preferably, block 45 signals the strobe to fire based upon the detection of the passage by a detector of the appropriate holder at a time based upon the variable time reduced by the preselected fixed time, so that the strobe flashes after a time inversely proportional to rotational speed. This ensures the strobe flashes at a fixed rotational angle after detection of passage of a preselected holder by an appropriate detector.

Referring now to FIG. 3B, there may be seen a block diagram of the circuitry of the present invention. More particularly, the signal of detector 30 depicted in FIG. 2 is seen to be the input to a trigger 50 which activates on the leading or rising edge of the reference slit pulse. This trigger 50 then provides a signal to a preset counter 52. This preset counter 52 has manual switches 54 which may be preselected to start the preset counter 52 at a time equal to the intrinsic strobe and firing circuitry delay. This preset counter 52 counts down to zero from its preselected value and then sends out a pulse. This pulse is supplied to a clock 56 which starts counting up when it receives the pulse from the preset counter 52. Also shown receiving a detector signal is a second trigger 58 which activates on the trailing or falling edge of the reference slit pulse to provide a signal to the clock; this signal causes the clock 56 to stop counting up and begin immediately counting back down to zero. At zero it sends a signal to the strobe through the strobe firing circuitry, to cause the strobe to fire. In this manner the appropriate intrinsic circuitry delay times can be preselected via the manual switches in the preset counter, after it has been appropriately measured.

However, it is also possible to adjust for the intrinsic circuitry delay time, without actually measuring this time. Referring now to FIG. 3B and FIG. 1, this may be easily accomplished by viewing the position of an image of collection tube 22 in the reticles of the optical viewer of camera 27, when the centrifuge operates at slow speed. The centrifuge speed is then increased to its maximum speed and the manual switch 54 adjusted until the image is in the same position noted at the slow speed. Alternatively, the manual switch 54 may be manipulated until a maximum signal is obtained from the detector array 26, while the centrifuge is operating at its maximum speed, without viewing the position of an image; this may be necessary if there is no optical viewing capability associated with camera 27.

Referring now to FIGS. 1, 2 and 3, it should be noted that the diode and detector pair (29 and 30) must be moved slightly backward, with respect to the direction of rotation of the centrifuge, to a new position to allow sufficient time for the counter to count up to some value of time corresponding to the slit width and then reverse and count down to zero and fire the strobe. Once this new position is determined and has then been set or fixed, the diode and detector pair then remain in this position. Alternatively, the reference disc 28 may be suitably adjusted to achieve this same effect.

In the prior art strobe firing circuitry, the strobe was instructed to fire as soon as the leading edge 40 of the reference disc slit was detected as passing between the diode and detector pair 29, 30. Because of the intrinsic delay in the detecting and firing circuits for the strobe, the image of the holder or collection vial would appear to creep forward with increasing speed. To compensate for this effect, the diode and detector pair 29, 30 could be mechanically advanced (rotated against the direction of the rotation of the centrifuge) to insure synchronous illumination of each holder or collection vial. However, the circuitry of the present invention electronically compensates for this effect and does so automatically without any manual intervention, once initially setup.

More specifically, in the prior art strobe firing circuitry, the strobe reached maximum brightness (flashed) at a fixed time after the leading edge of the referenced disc slit passed between the diode and detector pair 29, 30. So as the speed of rotation increased, so did the angle of rotation before the strobe flashed. In accordance with the present invention, the diode and detector pair 29, 30 remain stationary and still maintain synchronous illumination, by having the strobe flash at a fixed angle after the leading edge of the slit is detected. This is accomplished by having a variable time between the detection of a leading edge signal 40 and the command to fire. Referring again to FIG. 2, with the present invention the strobe reaches maximum brightness, i.e. flashes, at a time 2 $T_s$ after the detection of the leading edge of a slit in the reference disc 28. $T_s$ is the time it takes for the slit to pass between the diode and detector pair 29, 30 and is always inversely proportional to the rotational speed $\Omega$. After mechanically adjusting the diode and detector's 29, 30 position to compensate for the $2T_s$ offset, the circuitry will track perfectly at all speeds $\Omega$.

Thus, as can be seen from the foregoing discussion, the method of the present invention detects and measures a time inversely proportional to the centrifuge rotational speed, measures the intrinsic time delay of the strobe detection and firing circuitry and uses these times to determine a new strobe firing time based upon these two measurements. This new strobe firing time ensures the strobe flashes in coincidence with the passage of a preselected holder by the strobe 24 and detector array 26.

Figure 4:
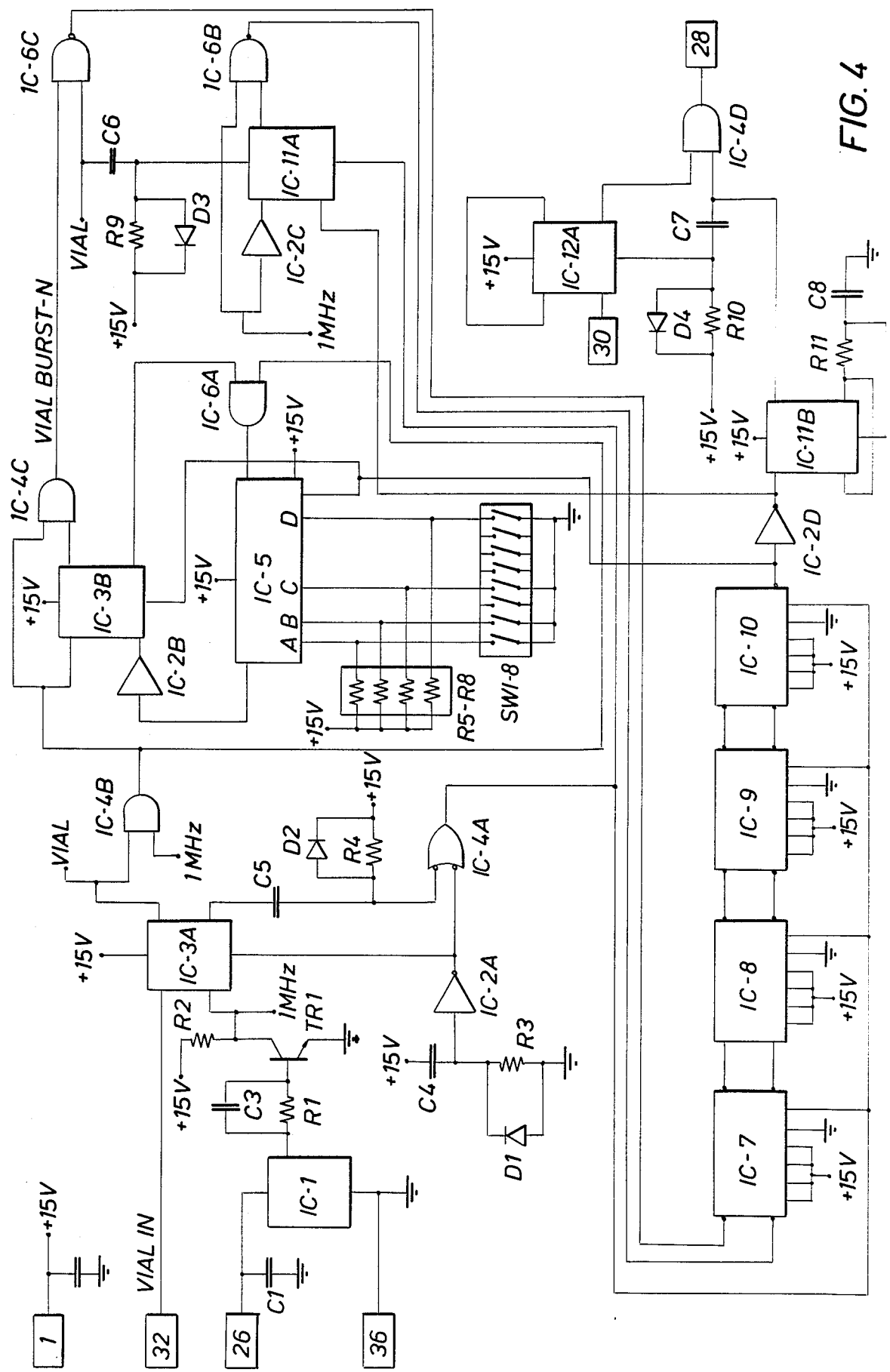
FIG. 4 is a schematic diagram of a preferred embodiment of the present invention.

Referring now to FIG. 4 there may be seen a specific circuit which is a preferred embodiment of the circuit of the present invention for use in a Beckman L8-55 M/P high speed centrifuge. Continuing to refer to FIG. 4 the circuit may be divided into the following sections: a power up initialization and reset section, a one megahertz signal generation and level shifting section, an input "vial" signal pulse shaping section, a speed sensing and delay subtraction section, a delay determination section, an output pulse stretcher section, and correct "vial" signal section. A description of each one of these sections of the circuitry depicted in FIG. 4 is as follows.

Operation of the power-up initialization and reset portion of the circuitry is as follows. Clearing and presetting of critical flip-flops and counters occurs because of the R/C network, C4 and R3, tied to the input of inverter IC-2A. Upon power-up, the +15 volt supply passes its output to the inverter input until the voltage caused by C4's charging current through R3 drops to near zero. This exponentiallydecaying positive pulse is inverted in IC-2A and applied to the "vial" input pulseshaping flip-flop, IC-3A. It is also applied to one input of IC-4A. This is a positive input AND gate used as a negative input OR gate. The output of this gate clears flip-flop IC-11A and loads binary ones's into all inputs of down/up counters, IC-7 through IC-10. Diode D1 provides a fast discharge path for C4 when the +15 volt supply is turned off. The other input of IC-4A receives a negative-going exponentiallydecaying pulse from the output of IC-3A through the differentiation network formed by C5 and R4. Diode D2 clamps the positive spike caused by the trailing edge of the Vial input pulse and prevents it from exceeding the inverter input voltage rating.

Operation of the one megahertz signal generation and level shifting portion of the circuitry is as follows. IC-1 is a commercially purchased crystal-controlled oscillator, which may be for example, but not limited to a Conner-Winfield #S14R5, 1 Mhz oscillator. It is the only TTL, +5 volt circuit used. Because of this, a separate power source (also used elsewhere in the circuit) is used to power this hybrid integrated circuit. Its power input lead is by-passed by C1 to ensure stable operation. Transistor TR1, resistors R1 and R2, and capacitor C3 form a 5 volt to 15 volt level shifter. This is necessary to provide proper signals to the CMOS circuits used in the remainder of the circuit. Capacitor C2 is used to by-pass the 15 volt power supply. Capacitor C3 ensures fast rise and fall times on the output of TR1.

Operation of the input vial signal pulse shaping portion of the circuity is as follows. IC-3A is used to improve the rise and fall times of the "vial" input signal. This positive-going signal has a rise and fall time before shaping of 14 $\mu$sec, and a width which varies from approximately 6,100 $\mu$sec at 100 rpm to 32 $\mu$sec at 19,000 rpm. IC-3A transfers the voltage level of the "D" input to the "Q" output on the positive edge of the 1 Mhz clock pulse. Because the "vial" input pulse is positive, the "Q" output follows the input. Rise time is converted to that of the flip-flop switching time, i.e. about 0.1–0.2 $\mu$sec. Output jitter of 1.5 $\mu$sec (max.) can occur between the clock and the "vial" pulse output, but this is significant due to the length of the maximum light output time of the strobe, approximately 5 $\mu$sec minimum.

Operation of the speed sensing and delay subtraction portion of the circuitry is as follows. AND gate IC-4B passes a burst of 1 Mhz pulses when the "vial" signal goes positive. The number of pulses passed is directly proportional to the width of a slit 31 in reference disc 28, i.e. "vial". Since "vial" width is inversely proportional to speed, a count of the number of 1 Mhz pulses in a "vial" burst is used in later circuits to establish a delay time inversely proportional to speed, Before this is done, however, a preset number of pulses are removed from the vial burst signal to account for the fixed strobe detection and firing circutry delays discussed previously herein. This action is accomplished as follows. A "vial" burst is applied to one input of AND gate IC-4C and to one input of NAND gate IC-6A. Because the "Q" output of IC-3B is initialized low, no pulses occur at the output of IC-4C. The "Q" NOT output of IC-3B is high and allows the vial burst to pass to the up counter, IC-5. This counter is initialized with a preset count which is the binary compliment of the number of microseconds of fixed delay one needs to accomplish the timing compensation. This selection is preset via switches 1, 2, 4, and 8 of switches SW1–SW8. Pull-up resistors R5–R8 ensure that a logic "1" is applied to each non-selected binary input. Therefore, if 6 $\mu$sec delay is needed, switches SW2 and SW4 would be turned ON'. This effectively presets IC-5 with the binary equivalent of $-6$ counts. During the negative-going excursion of the 6th clock pulse, a negative-going "carry" occurs at IC-5, pin 12. This excursion is inverted in IC-2B and applied as a clock pulse to latch IC-3B. Because of propagation delays encountered in IC-6A, IC-5, and IC-2B, the "D" input of IC-3B has returned to a high level due to the positive-going transition of the 7th clock pulse by the time the carry pulse arrives to clock IC-3B. This sets the "Q" output of IC-3B high and enables gate IC-4C. The NAND gate, IC-6A, is now disabled by the "Q NOT" output of IC-3B. The gate output of IC-4C, therefore, is a burst of 1 Mhz pulses proportional to speed and with a preset number of pulses removed. This signal is labeled VIAL BURST–N on the schematic.

Operation of the delay determination portion of the circuitry is as follows. Counter chain IC-7 through IC-10 is used in a manner similar to the delay subtration circuit above except that instead of a preset negative count, the VIAL BURST–N signal is used as a down count to continuously monitor and adjust for speed changes. Four stages were needed to ensure that at the slowest speed, the counter would not fill to its maximum count. VIAL BURST–N pulses are routed through NAND gate IC-6C and "ANDED" with "vial" before appearing at the "down" input of counter IC-7. At the end of the VIAL pulse, gate IC-6B is turned "on" in order that 1 Mhz clock pulses may then be fed to the "up" input of the counter chain. When the count reaches zero, a carry pulse, inverted by IC-2D, causes latch IC-11A to turn "off" gate IC-6B and thus inhibit further "up" count input pulses. It is a stretched and selected version of the carry pulse which fires the strobe light.

Operation of the output pulse stretched portion of the circuitry is as follows. IC-11B, R11, and C8 are connected in such a manner as to form a triggered monostable multivibrator. Initially, the "Q" output is low due to the capacitor, C8, tied between the clear input of IC-11B and circuit common. Upon power-up, this clears the flip-flop and starts charging C8 through R11. The first "carry" pulse clocks the logic "1" from the "D" input to the "Q" output. The charge on C8 now bleeds off through R11 whose supply end is now at logic "0". When enough charge leaks off so that the "clear" input is again at logic "0", then the "Q" output is again logic "0" and the circuit waits for another clock pulse. This action effectively lengthens the 0.5 $\mu$sec "carry" pulse to about 7 $\mu$sec.

Operation of the correct vial signal portion of the circuitry is as follows. Gate IC-4D, and latch IC-12A are used to inhibit all stretched strobe firing pulses except those determined by present logic circuits to be the ones of interest. The latch, IC-12A is cleared on power-up via the capacitor, C7, and on the trailing edge of the stretched pulse via the differentiation network formed by C7 and R10. D4 clamps the positive differentiated pulse to a safe level. A correct vial signal pulse causes the "Q" output to go to a logic "1" and enables one input of gate IC-4D. As soon as a stretched pulse appears on the other input of AND gate IC-4D, the output goes positive and fires the strobe light.

Alternatively, the circuitry of the present invention may be adapted to mechanically increment the diode and detector pair ( in proportion to the time inversely proportional to speed reduced by the intrinsic firing delay) to ensure the strobe fires at a fixed angular rotation after detection of the slit leading edge.

Many other variations and modifications may be made in the apparatus and techniques hereinbefore described, by those having experience in this technology, without departing from the concept of the present invention. Accordingly, it should be clearly understood that the apparatus depicted in the accompanying drawings and referred to in the foregoing description are illustrative only and are not intended as limitations on the scope of the invention.

What is claimed is:

1. A method, comprising:
   providing a centrifuge having a strobe and having a means for detection and firing of said strobe having an intrinsic measurable time delay,
   measuring the intrinsic time delay of said means for detection and firing circuitry for said strobe,
   measuring a variable time in functional relationship to a rotational speed of said centrifuge,
   determining a strobe firing time from said measured variable time and said time delay, and
   activating said strobe based upon said determined strobe firing time.

2. A method, as described in claim 1, wherein said functional relationship is inverse proportionality.

3. A circuit for activating a strobe of centrifuge, comprising:
   means for detecting and converting the rotational speed of said centrifuge into a variable time interval in functional relationship to said rotational speed,
   means for preselecting a fixed time interval; and
   means for substracting said fixed time interval from said variable time interval and responsive to said means for detecting and converting to activate said strobe.

4. A circuit as described in claim 3, wherein said functional relationship is inverse proportionality.

5. A circuit for activating a strobe of a centrifuge, comprising:
   detector means for determining a preselected centrifuge holder proximate said detector means and the rotational speed of said holder,
   clock means,
   pulse shaping means responsive to said detector means and said clock means for generating a signal representative of said rotational speed,
   first counter means for containing a signal representative of a preselected fixed time,
   means for combining said signal representative of said rotational speed with said signal representative of said preselected fixed time,
   second counter means responsive to said means for combining and said pulse shaping means for generating a first output signal, and
   means for modifying said first output signal to become a signal for activating said strobe.

6. A circuit for activating a strobe of a centrifuge, comprising:
   detector means for detecting a preselected centrifuge holder proximate said detector means,
   first pulse shaping means responsive to said detector means for generating a first signal representative of the detection of said holder,
   counter means for adjusting said first signal from said first pulse shaping means by an amount respresentative of a time delay,
   second pulse shaping means responsive to said detector means for generating a second signal representative of the loss of detection of said holder, and
   clock means for activating such a strobe responsive to said adjusted first signal and said second signal.

7. A circuit for activating a strobe for a centrifuge having a rotatable rotor, comprising:
   detector means for detecting a preselected centrifuge holder prximate said detector means, and
   means responsive to said detector means for generating a signal to cause such a strobe to reach maximum intensity at a predetermined angle of rotation of such a rotor for any rotational speed of such a rotor for such a centrifuge, with the start of said angle determined by the detection of said preselected holder by said detector means.

8. A method for activating a strobe for a centrifuge having a rotatable rotor, comprising:
   detecting a preselected centrifuge holder proximate a preselected position, and
   generating a signal to cause such a stobe to reach maximum intensity at a predetermined angle of rotation of such a rotor for any rotational speed of such a rotor of such a centrifuge, with the start of said angle determined by said detecting of said preselected holder proximate said position.

* * * * *